United States Patent
Wu et al.

(10) Patent No.: US 8,503,789 B2
(45) Date of Patent: Aug. 6, 2013

(54) METHOD AND SYSTEM FOR MEASURING DEFLECTION ANGLE OF A CAMERA LENS

(75) Inventors: Wen-Yi Wu, Shenzhen (CN); Xi Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 647 days.

(21) Appl. No.: 12/728,656

(22) Filed: Mar. 22, 2010

(65) Prior Publication Data
US 2011/0141292 A1    Jun. 16, 2011

(30) Foreign Application Priority Data
Dec. 14, 2009    (CN) .......................... 2009 1 0311391

(51) Int. Cl.
*G06K 9/46* (2006.01)
*G06K 9/66* (2006.01)

(52) U.S. Cl.
USPC ............ 382/190; 348/187; 382/145; 382/203

(58) Field of Classification Search
USPC .................. 348/187; 382/145, 190, 203, 286
See application file for complete search history.

(56) References Cited

U.S. PATENT DOCUMENTS

| 5,159,643 | A | * | 10/1992 | Kaga et al. ..................... 382/286 |
| 6,900,888 | B2 | * | 5/2005 | Yoshida et al. ............. 356/237.4 |
| 7,442,924 | B2 | * | 10/2008 | Giannuzzi et al. ............. 250/307 |
| 7,796,871 | B2 | * | 9/2010 | Park et al. ........................ 396/50 |
| 2001/0009470 | A1 | * | 7/2001 | Kamikubo ..................... 359/197 |
| 2005/0263715 | A1 | * | 12/2005 | Nakasuji et al. ........ 250/396 ML |

* cited by examiner

*Primary Examiner* — Gregory M Desire
(74) *Attorney, Agent, or Firm* — Altis Law Group, Inc.

(57) ABSTRACT

A system for measuring lens deflection of an electronic device includes a first shape, an image processing module, a first angle calculation module, and a second angle calculation module. The first shape is formed by edges of an ideal image captured that corresponds to a correctly mounted lens in the electronic device. The image processing module processes a currently captured image to acquire a second shape formed by edges of the present image. The first shape and the second shaped are imposed on each other. The first angle calculation module computes a first angle according to a rotation angle of the second shape relative to the first shape. A second angle calculation module computes a second angle according to a translating distance of the second shape relative to the first shape.

6 Claims, 5 Drawing Sheets

METHOD AND SYSTEM FOR MEASURING DEFLECTION ANGLE OF A CAMERA LENS

BACKGROUND

1. Technical Field

The present disclosure relates to measuring methods and systems, and particularly to a method and system for measuring lens deflection.

2. Description of Related Art

At present, electronic devices are increasingly equipped with camera modules. Testing of the camera modules is necessary before reaching the market. The test often includes determination of any lens deflection and corresponding deflection angle.

There is currently no efficient method for measuring lens deflection. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
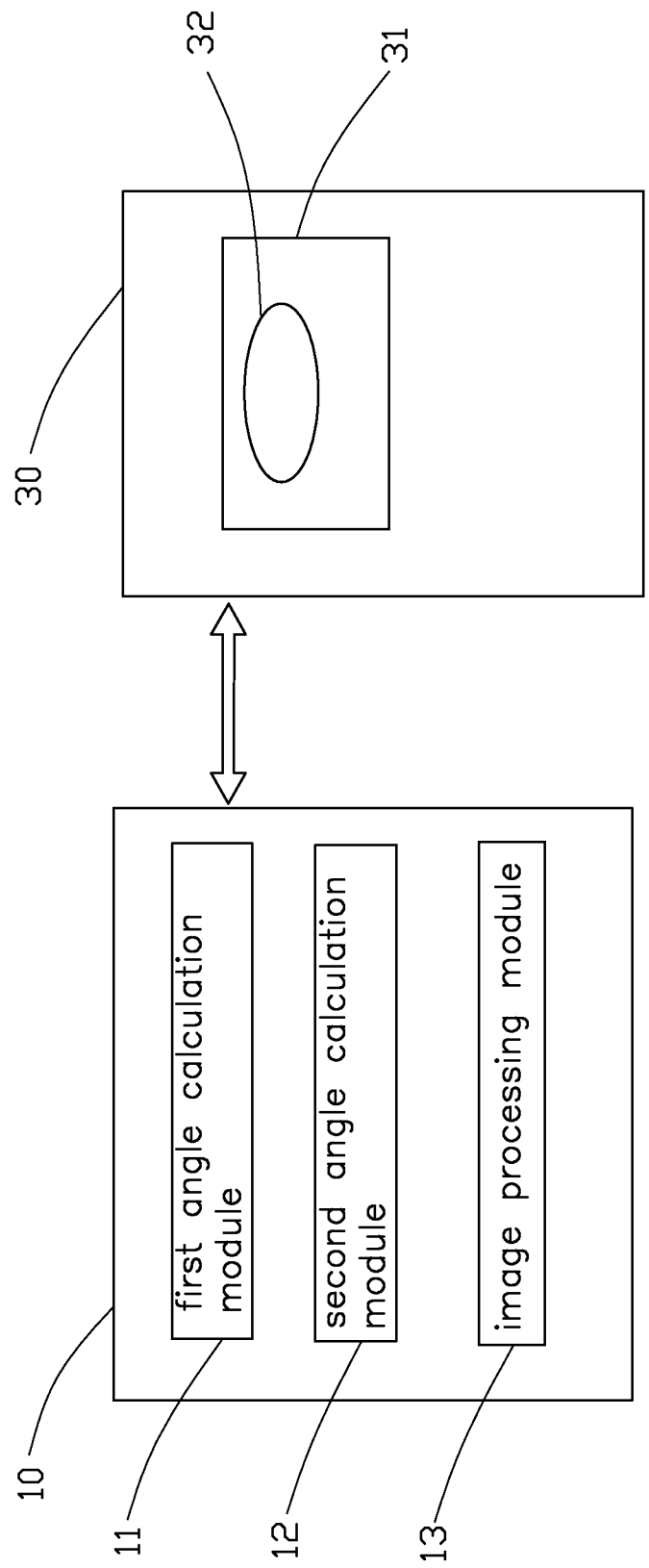
FIG. 1 is a block diagram of an embodiment of a system for measuring lens deflection in an electronic device.

Referring to FIG. 1, a system 10 for measuring lens deflection of a lens 32 includes a first angle calculation module 11, a second angle calculation module 12, and an image processing module 13. The lens 32 can be part of a camera module 31 of an electronic device 30.

Figure 2:
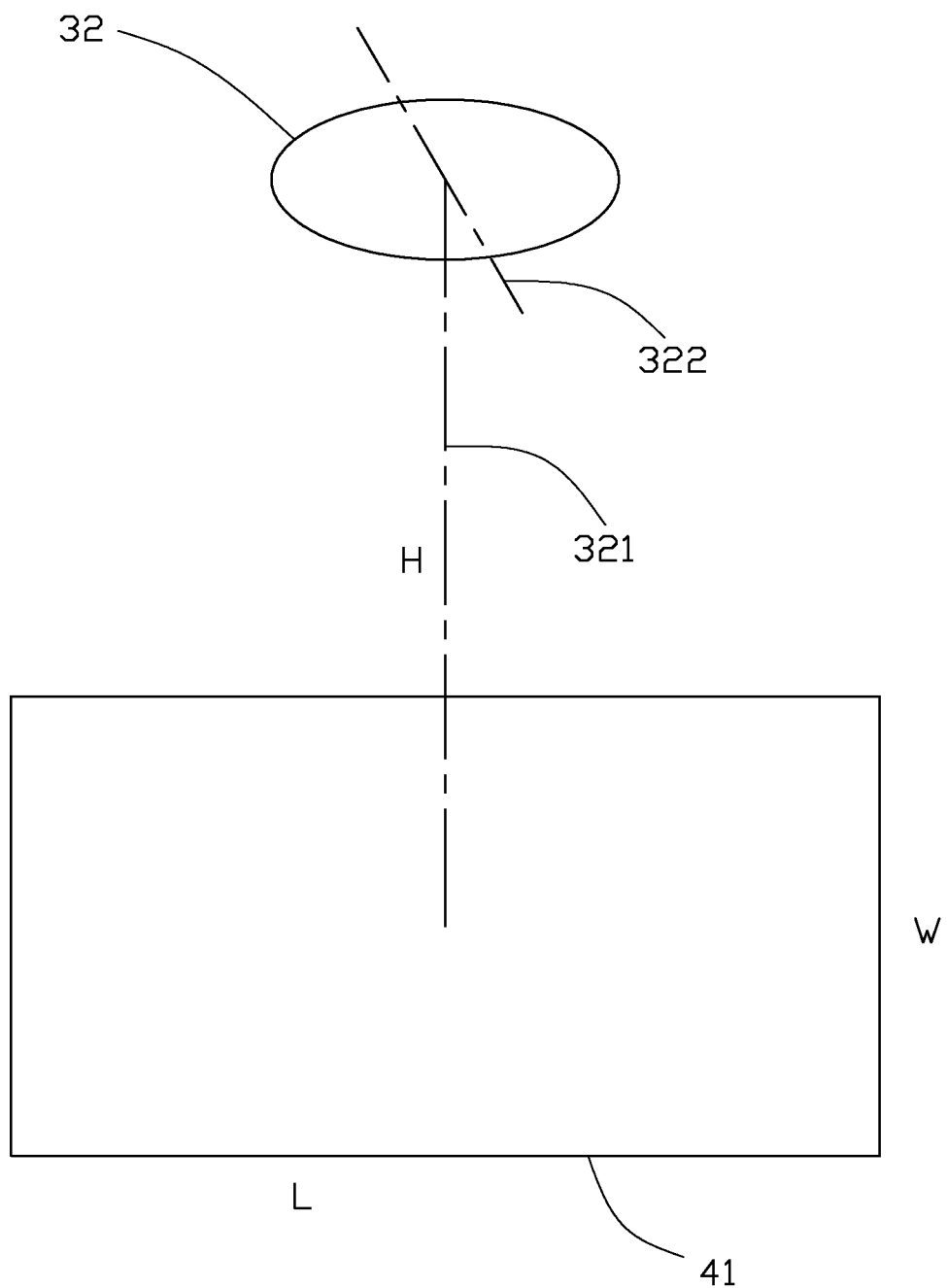
FIG. 2 is a sketch diagram of a lens correctly mounted in an electronic device.

Referring to FIG. 2, the lens 32 has a first axis 321 perpendicular to the lens 32, and a second axis 322 parallel to the lens 32. If the lens 32 is correctly mounted in the electronic device 30 and in an ideal position, edges of a captured image form a first rectangular frame 41, having a length L and width W. The first rectangular frame 41 is an ideal image. Distance between a center of the lens 32 and a center of the first rectangular frame 41 is H.

Figure 3:
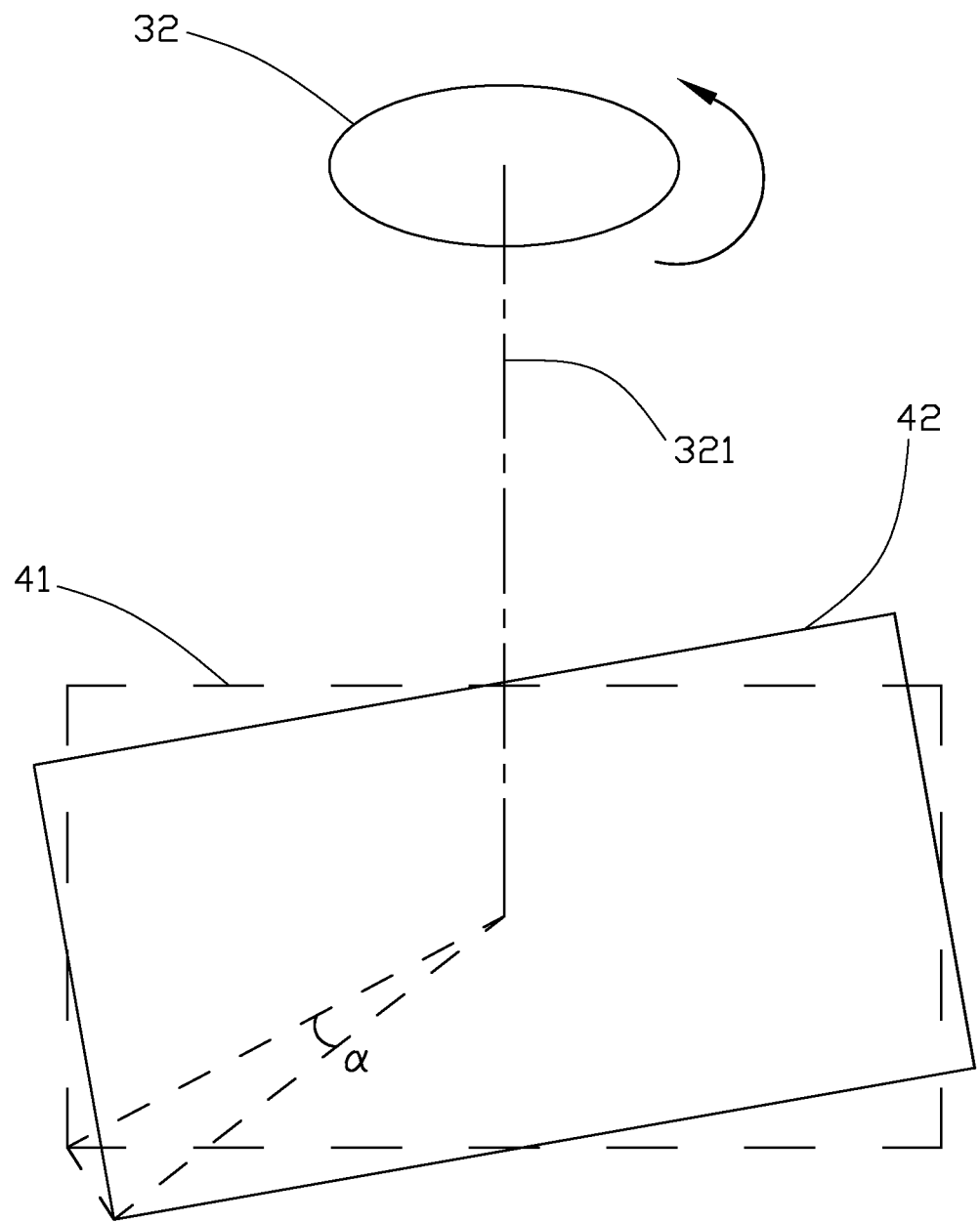
FIG. 3 is a sketch diagram of a lens deflected by a first angle around a first axis of the lens.

Referring to FIG. 3, if the lens 32 mounted in the electronic device 30 is deflected by a first angle around the first axis 321 relative to the ideal position, edges of a second captured image form a second rectangular frame 42. The image processing module 13 imposes first rectangular frame 41 over second rectangular frame 42. A center of the second rectangular frame 42 coincides with the center of the first rectangular frame 41. As shown in FIG. 3, the second rectangular frame 42 rotates an angle α relative to the first rectangular frame 41. A value of the angle α is measured by the first angle calculation module 11. The first angle of the lens 32 deflecting around the first axis 321 is equal to the angle α.

Figure 4:
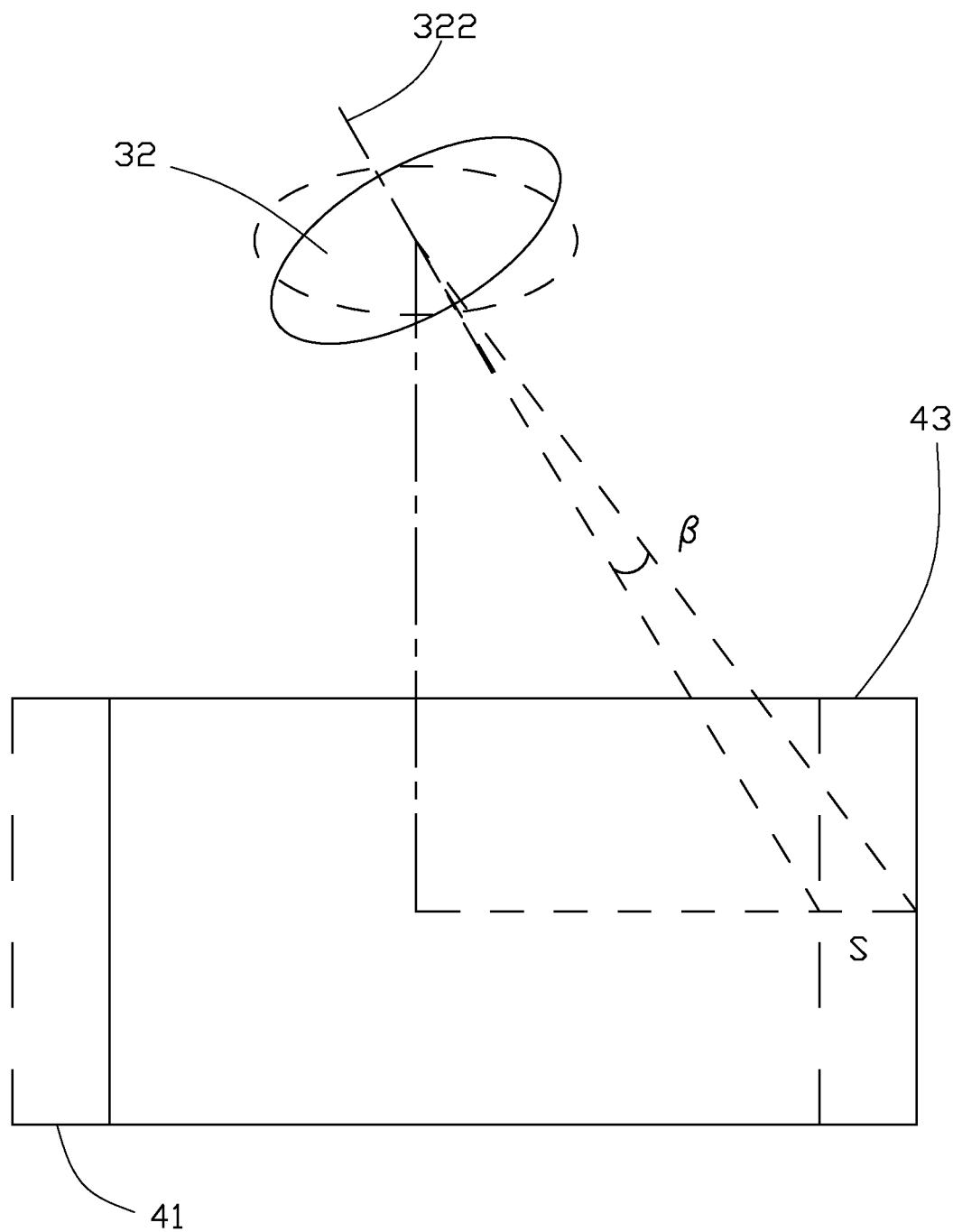
FIG. 4 is a sketch diagram of the lens deflected by a second angle around a second axis of the lens.

Referring to FIG. 4, if the lens 32 mounted in the electronic device 30 deflects a second angle β around the second axis 322 relative to the ideal position, another image is captured with edges forming a third rectangular frame 43. The image processing module 13 imposes first rectangular frame 41 over third rectangular frame 43. The third rectangular frame 43 translates a distance S relative to the first rectangular frame 41. The second angle calculation module 12 computes the second angle β equaling arctg (L/2+S)/H−arctg L/2H.

In normal situation, the lens 32 often deflects around the first axis 321 and the second axis 322 simultaneously. Therefore, the edges of corresponding image captured by the lens 32 rotate by an angle relative to the first rectangular frame 41, and translate a distance relative to the first rectangular frame 41. The first angle around the first axis 321 is equal to the angle by which the edges of the corresponding image are deflected relative to the first rectangular frame 41. The second angle around the second axis 322 is calculated based on the distance of the edges of the corresponding image from the first rectangular frame 41.

Figure 5:
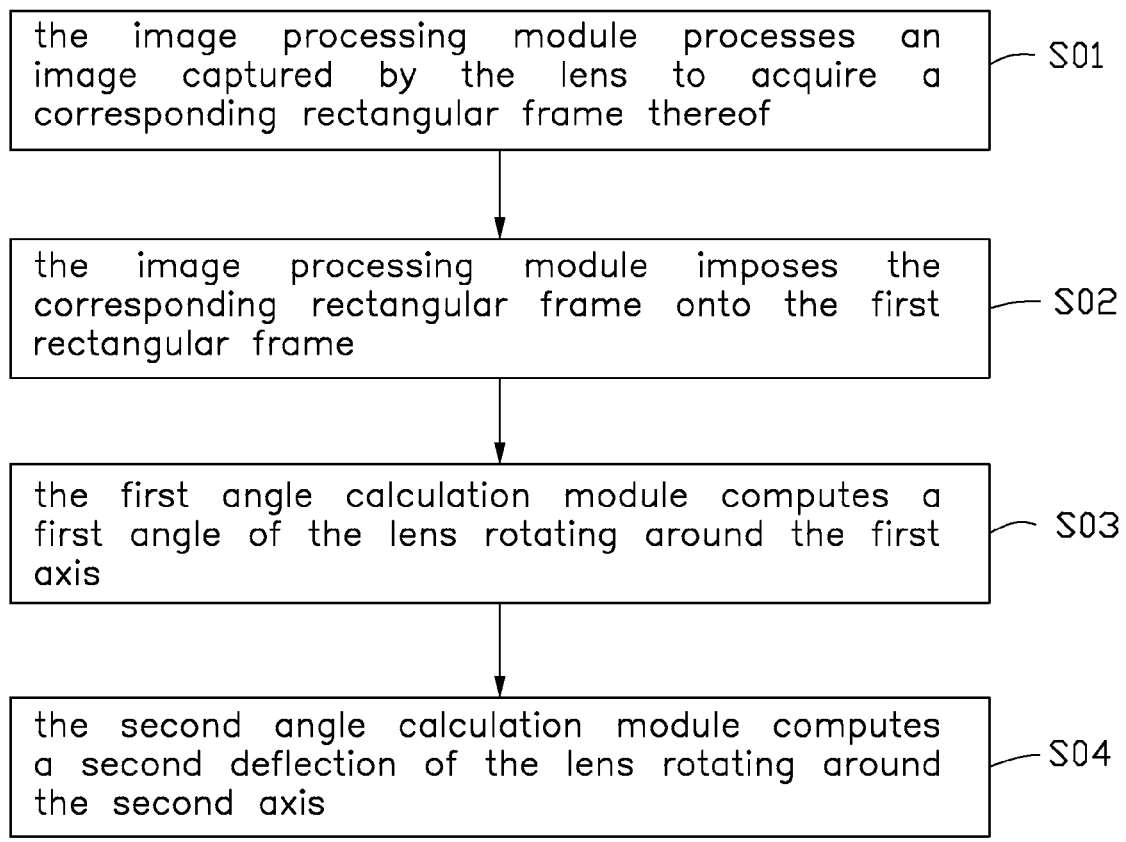
FIG. 5 is a flowchart of a method for measuring lens deflection of an electronic device.

Referring to FIG. 5, a method for measuring lens deflection is shown, as follows.

In step S01, the image processing module 13 processes an image captured by the lens 32 to acquire a corresponding rectangular frame thereof.

In step S02, the image processing module 13 imposes the corresponding rectangular frame onto the first rectangular frame 41.

In step S03, the first angle calculation module 11 computes a first angle of the lens rotating around the first axis 321 as compared to the ideal position of the lens 32, corresponding to the first rectangular frame 41.

In step S04, the second angle calculation module 12 computes a second angle of the lens rotating around the second axis 322 as compared to the ideal position of the lens 32, corresponding to the first rectangular frame 41.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus for measuring lens deflection of an electronic device, comprising:
   an EPROM, an image processing module, a first angle calculation module, and a second angle calculation module resided in the EPROM;
   the image processing module capable of processing a present image, captured by the lens, to acquire a second shape formed by edges of the present image; the image processing module capable of comparing the second shape with a first shape, wherein the first shape comprises of an ideal image that corresponds to a correctly mounted lens;
   the first angle calculation module capable of computing a first angle according to a rotation angle of the second shape relative to the first shape; and
   the second angle calculation module capable of computing a second angle according to a translating distance of the second shape relative to the first shape.

2. The apparatus of claim 1, wherein the first angle is an angle of the lens rotating around a first axis perpendicular to the lens.

3. The apparatus of claim 2, wherein the first angle is equal to the rotation angle of the second shape relative to the first shape.

4. The apparatus of claim 1, wherein the second angle is an angle of the lens rotating around a second axis parallel to the lens.

5. The apparatus of claim 4, wherein the first shape is a rectangle, the rectangle has a length L, a width W, and a distance between a center of the lens and a center of the first shape H, and the translating distance of the second shape relative to the first shape is S; and the second angle is equal to arctg $(L/2+S)/H$ − arctg $L/2H$.

6. The apparatus of claim 1, wherein the image processing module compares the first shape with the second shape by overlaying the ideal image and the present image on each other.

* * * * *